Feb. 7, 1967 J. N. PRATT 3,303,430
OSCILLATOR SYNCHRONIZATION
Filed Oct. 8, 1965
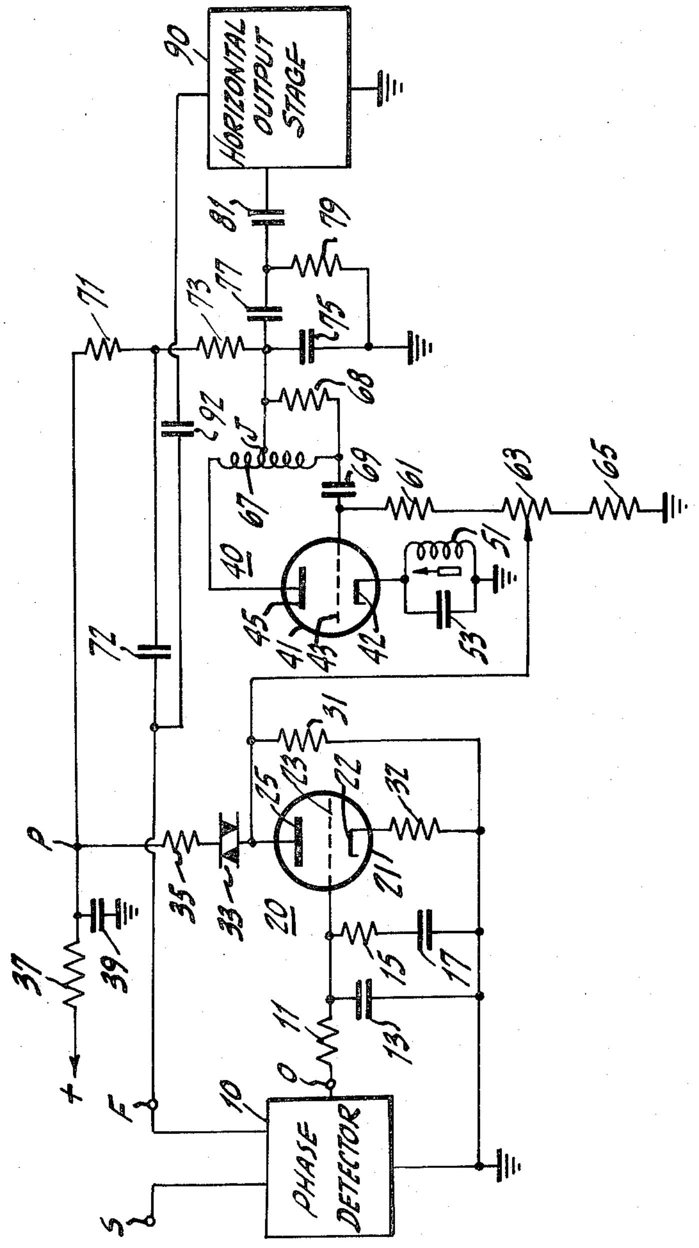
INVENTOR.
JOHN N. PRATT
BY William H. Meagher
Attorney Patented Feb. 7, 1967

3,303,430
OSCILLATOR SYNCHRONIZATION

John Norman Pratt, Indianapolis, Ind., assignor to Radio Corporation of America, a corporation of Delaware Filed Oct. 8, 1965, Ser. No. 494,096
3 Claims. (Cl. 331—20)

This invention relates generally to apparatus for synchronizing the operation of an oscillator, such as the horizontal deflection oscillator of a television receiver, and, particularly, to circuit arrangements thereof for reducing adverse effects of supply voltage variations.

A conventional approach to the synchronization of the line scan process in a television receiver involves the use of automatic frequency control (AFC) techniques. The periodic line scan waveform is generated under the control of a horizontal deflection oscillator; the oscillator output is compared in phase with the horizontal synchronizing pulses of the received composite video signal to develop a control voltage for application to the oscillator to adjust its frequency toward synchronism.

Illustrative of a practical embodiment of such synchronization techniques is the deflection AFC circuit arrangement of the RCA CTC-15 color television receiver chassis, as shown in the RCA Service Data pamphlet designated 1963 No. T6. The CTC-15 circuitry incorporates a horizontal deflection oscillator of a blocking oscillator form; a dual diode phase detector develops a control voltage output of an amplitude and polarity representative of the magnitude and sense of the phase difference, if any, between the oscillator output and incoming horizontal sync pulses. The control voltage output of the phase detector is amplified in a D.C. amplifier stage, and then applied to the control grid of the oscillator tube to control the operating frequency of the blocking oscillator. The presence of the D.C. amplifier stage provides enhanced loop gain in the AFC system to ensure desirable pull-in and hold characteristics.

A problem has been encountered with deflection AFC arrangements of the above-described type involving oscillator drift under conditions of varying B+ supply voltage (e.g., due to line voltage variations). The present invention is directed to a solution of this problem. The solution stems from a recognition that, due to a tendency of the D.C. amplifier stage to regulate against supply voltage variations, the control voltage output of the amplifier in the prior art arrangement was insufficiently altered, when the supply voltage departed from design center value, to compensate for other oscillator operating parameter changes attending such departures.

In accordance with the principles of the present invention, such insufficiency is overcome by providing the D.C. amplifier with a suitably voltage responsive load so that the control voltage output of the D.C. amplifier adequately responds to supply voltage variations to prevent the concomitant changes in the other oscillator parameters from introducing an undesired frequency change. In accordance with a particular embodiment of the present invention, the desired voltage responsive load is obtained by inclusion of a suitably valued voltage dependent resistor (VDR) in the connection between the television receiver's B+ supply and the anode of the D.C. amplifier tube.

A primary object of the present invention accordingly, is to provide an oscillator AFC arrangement with improved operating frequency stability in the face of supply voltage variations.

Other objects and advantages of the present invention will be readily recognized by those skilled in the art upon a reading of the following detailed description and an inspection of the accompanying drawing in which the horizontal deflection circuitry of a television receiver, including a deflection AFC arrangement embodying the principles of the present invention, is illustrated, using a combined block and schematic presentation.

The deflection circuitry illustrated in the drawing includes a phase detector 10, a D.C. amplifier stage 20, a horizontal oscillator 40 and a horizontal output stage 90, cooperating in a general configuration corresponding to that employed in the previously mentioned CTC-15 receiver. Phase detector 10 compares in phase the output of oscillator 40 (supplemented by an output of the horizontal output stage 90, for purposes to be later described) with the separated horizontal synchronizing pulse component of the received waves (appearing at input terminal S) to develop an error voltage output informative of the magnitude and sense of the phase difference, if any. The error voltage output of the detector 10 is amplified by stage 20 and applied as a frequency controlling voltage to oscillator 40. The synchronized output of oscillator 40 is used to drive the horizontal output stage 90, which serves to energize the horizontal windings of the receiver's deflection yoke (not illustrated).

Considering the circuitry in greater detail, the error voltage output of detector 10, appearing at the detector output terminal O, is applied via a series resistor 11 to the control grid 23 of a triode 21, serving as the active device of the D.C. amplifier stage 20. A capacitor 13, connected between the control grid 23 and a point of reference potential (e.g., chassis ground), forms with resistor 11 a low pass filter, for eliminating horizontal frequency, and other high frequency, components of the detector output. Shunting the filter capacitor 13 is the series combination of a resistor 15 and a capacitor 17, serving a familiar anti-hunt purpose (i.e., precluding the AFC loop from oscillating at any of the relatively low frequencies to which it responds).

The cathode 22 of the D.C. amplifier triode 21 is returned to chassis ground via a bias resistor 32. Anode voltage for the D.C. amplifier stage is supplied via a network including the series combination of a resistor 35, a VDR 33 and a resistor 31, connected, in the order named, between a supply point P and chassis ground, with the anode 25 connected to the junction of VDR 33 and resistor 31. The supply point P is connected via a resistor 37 to an output of the receiver's B+ supply; a capacitor 39 connected between point P and chassis ground cooperates with resistor 37 for familiar decoupling purposes.

The horizontal oscillator 40 is arranged as a blocking oscillator, employing a transformer 67 for establishing feed-back between anode 45 and control grid 43 of a triode 41. A pair of resistors 71 and 73 are connected in series between the supply point P and joined end terminals (junction point J) of the plate and grid windings of the transformer 67. The opposite end terminal of the plate winding is directly connected to anode 45, while the opposite end terminal of the grid winding is coupled via a capacitor 69 to the control grid 43. The grid winding is shunted by a resistor 68. A direct current path between control grid 43 and chassis ground is provided by the series combination of resistor 61, potentiometer 63 and resistor 65. The adjustable tap on potentiometer 63 is directly connected to the anode 25 of the D.C. amplifier triode 21.

For a detailed explanation of the operating principles of a blocking oscillator of the general form above described, reference may be made, for example, to the oscillator description in U.S. Patent 2,538,541 issued to Simeon I. Tourshou on January 16, 1951. For present purposes, it should be sufficient to note that the frequency of oscillations generated by the circuit will be primarily determined by the parameters associated with the networks serving to periodically charge and discharge capacitor 69. Of particular interest herein, as will be subsequently discussed, is the effect of variations in the supply potential at point P on such parameters.

The cathode 42 of the oscillator triode 41 is connected to chassis ground by means of a parallel resonant circuit comprising the tunable inductor 51 shunted by capacitor 53. The function performed by this resonant circuit is one of frequency stabilization, as, for example, discussed in U.S. Patent 2,633,554, issued to Simeon I. Tourshou on March 31, 1953. It should be noted that, while this network does contribute a stabilizing effect on the frequency of operation of oscillator 40, the present invention is concerned with minimizing certain tendencies toward frequency drift that can occur in spite of the presence of the stabilizing action of the network 51–53.

The output waveform of oscillator 40 is developed across a capacitor 75, connected between the junction point J and chassis ground, and is of a substantially sawtooth wave shape. This waveform is altered by a waveshaping network which couples the oscillator output to the input of the horizontal output stage. This waveshaping network includes a pair of series capacitors 77 and 81 and a shunt resistor 79, the latter connected between the junction of capacitors 77 and 81 and the chassis ground.

A sawtooth voltage waveform, representative of the oscillator output is coupled back to the phase detector 10, for phase comparison with the incoming sync pulses, by means of a capacitor 72 coupled between the junction of resistors 71 and 73 and input terminal F of detector 10. The timing of the retrace stroke of the fedback sawtooth is slightly modified, to avoid "foldover," by additionally feeding back to the same detector input terminal (F), via an additional capacitor 92, a flyback pulse component derived from the horizontal output stage 90.

To appreciate the function performed by VDR 33 in the anode circuit of the D.C. amplifier stage 20, it is appropriate to consider the operation of the disclosed circuit in the absence of such an element (i.e., assuming the load presented between the anode 25 and supply point P to be comprised solely of conventional, "voltage independent" resistance elements. Under such conditions, the characteristics of the triode amplifier are such as to tend to regulate against supply potential variations. That is, the voltage at anode 25 will not track with supply potential variations at point P, but will rather tend to remain relatively constant. Thus, for example, a 25% increase or decrease in supply potential from its design center value will be reflected in a far smaller percentage change in the voltage at anode 25.

Contrary to what might be expected, this regulating action of triode 21 is disadvantageous; actually, oscillator 40 requires a control voltage input that substantially faithfully tracks with B+ variations in order to preclude undesired frequency shifts. The reason for such a tracking requirement is that other oscillator frequency-affecting parameters (e.g., capacitor-charging source potential, triode cut-off level) vary with B+ alterations in such a manner as to require an offsetting change in control grid bias (i.e., the D.C. amplifier output) that is substantially linearly proportional to the B+ variations if the operating frequency is to remain stable. Thus, failure of the control voltage input to track a B+ variation appears as a spurious phase error indication causing undesired oscillator frequency shifts.

In the illustrated embodiment of the present invention, the effect of the above-discussed triode regulating action is overcome and proper B+ tracking is introduced through the use of a voltage-responsive impedance element in the anode-circuit of the D.C. amplifier stage 40. Specifically, a VDR 33 is incorporated in that portion of the anode supply potential divider which is presented between anode 25 and supply point P. The resistance of VDR 33 varies inversely with changes in the magnitude of the supply potential at point P, and thus tends to enhance the degree to which the potential at anode 25 reflects changes in supply potential at point P. By suitable choice of VDR characteristic, the effect may be obtained of substantially linearly proportional changes in anode 25 potential whenever the supply voltage varies.

It may be noted that a slight departure from strictly linear proportionality in an overcorrecting sense may be the optimum choice to take into account effects of line voltage variations on tube filament energization, where such effects are significantly present.

In a particular working embodiment of the present invention providing satisfactory frequency stability in the face of supply voltage variations, the schematically illustrated circuit parameters had selected values which are set forth in the table below, by way of example:

| | | |
|---|---|---|
| Resistor 11 | ohms | 560,000 |
| Resistor 15 | do | 12,000 |
| Resistor 31 | do | 56,000 |
| Resistor 32 | do | 1,000 |
| Resistor 35 | do | 82,000 |
| Resistor 37 | do | 680 |
| Resistor 61 | do | [1] 200,000 |
| Resistor 65 | do | 22,000 |
| Resistor 68 | do | 68,000 |
| Resistor 71 | do | 33,000 |
| Resistor 73 | do | 27,000 |
| Resistor 79 | do | 110,000 |
| VDR 33 | do | [2] Varistor |
| Potentiometer 63 (hold control) | do | 35,000 |
| Capacitor 13 | micromicrofarads | 1,000 |
| Capacitor 17 | microfarads | .15 |
| Capacitor 39 | do | 30 |
| Capacitor 53 | do | .01 |
| Capacitor 69 | micromicrofarads | 390 |
| Capacitor 72 | do | 820 |
| Capacitor 75 | do | 680 |
| Capacitor 77 | microfarad | .0015 |
| Capacitor 81 | do | .01 |
| Capacitor 92 | micromicrofarads | 27 |
| Triodes 21, 41 | | 6FQ7 |
| Nominal B+ | volts | 405 |

[1] Shunted by 1.5 megohms.
[2] 110 volts at 1 ma.

What is claimed is:

1. A deflection AFC arrangement including:
a deflection oscillator;
phase detector means for developing an error voltage output indicative of the magnitude and sense of the phase difference, if any, between an output of said deflection oscillator and a synchronizing waveform;
means for amplifying the error voltage output of said phase detector means;
means for applying the output of said amplifying means to said oscillator to control the oscillator frequency;
a source of unidirectional operating potential subject to undesired variations;
said oscillator including a first signal translating device having a plurality of electrodes and deriving an operating potential from said source;
said amplifying means including a second signal translating device having an output electrode;
said output applying means comprising direct current conductive means connecting said output electrode to one of said plurality of electrodes of said first signal translating device;
and means for rendering the operating frequency of said oscillator substantialy insensitive to said undesired potential variations, said last-named means comprising a voltage-responsive impedance element coupled between said output electrode and said potential source.

2. Automatic frequency control apparatus including:
a relaxation oscillator;
phase detector means for developing an error voltage output indicative of the magnitude and sense of the phase difference, if any, between an output of said oscillator and a synchronizing waveform;

means for amplifying the error voltage output of said phase detector means;

means for applying the output of said amplifying means to said oscillator to control the oscillator frequency;

a source of unidirectional operating potential subject to undesired variations;

said oscillator including an electron tube having an anode and a control grid and deriving an operating potential for said anode from said source, said oscillator also including a capacitor coupled to said control grid, and a charging circuit for said capacitor including said source;

said amplifying means including a second electron tube having an output electrode;

said output applying means comprising direct current conductive means connecting said output electrode to said control grid;

and means for rendering the operating frequency of said oscillator substantially insensitive to said undesired potential variations, said last-named means comprising a voltage dependent resistor coupled between said output electrode and said potential source.

3. A deflection AFC arrangement including:

a deflection oscillator;

phase detector means for developing an error voltage output indicative of the magnitude and sense of the phase difference, if any, between an output of said deflection oscillator and a synchronizing waveform;

means for amplifying the error voltage output of said phase detector means;

means for applying the output of said amplifying means to said oscillator to control the oscillator frequency;

a source of unidirectional operating potential subject to undesired variations;

said oscillator including a first electron discharge device having a control grid, a grid capacitor, and means for establishing a charging circuit for said capacitor including direct current conductive means connecting the side of said capacitor remote from said grid to said source;

said amplifying means including a second electron discharge device having an anode;

said output applying means comprising direct current conductive means connecting said anode to said control grid;

and means for rendering the operating frequency of said oscillator substantially insensitive to said undesired potential variations, said last-named means comprising a voltage dependent resistor connected between said anode and said potential source.

No references cited.

ROY LAKE, *Primary Examiner.*

J. KOMINSKI, *Assistant Examiner.*